United States Patent [19]
Sohrt et al.

[11] Patent Number: 5,354,089
[45] Date of Patent: Oct. 11, 1994

[54] MOBILE CARRIER FOR AUGMENTATIVE COMMUNICATION

[76] Inventors: Thomas M. Sohrt; Carrie A. Sohrt, both of 2732 Juniper #1, Santa Ana, Calif. 92704; James E. Holliday, 1118 Sierra Ave., Santa Ana, Calif. 92707

[21] Appl. No.: 62,112

[22] Filed: May 14, 1993

[51] Int. Cl.⁵ .......................... B62B 1/04; B62B 1/12
[52] U.S. Cl. .................... 280/645; 280/652; 280/47.315; 280/47.33; 280/DIG. 6
[58] Field of Search ............... 280/641, 645, 651, 652, 280/47.28, 47.29, 47.315, 47.33, DIG. 6

[56] References Cited

U.S. PATENT DOCUMENTS

| | | | |
|---|---|---|---|
| 2,373,279 | 4/1945 | Vogt | 280/47.29 X |
| 2,470,272 | 5/1949 | Trimmer | 280/DIG. 6 X |
| 2,761,691 | 9/1956 | George | 280/DIG. 6 X |
| 2,784,005 | 3/1957 | Abgarian | 280/645 |
| 2,868,559 | 1/1959 | Vincelette | 280/47.33 |
| 2,921,797 | 1/1960 | Berglund et al. | 280/645 |
| 3,655,212 | 4/1972 | Krass et al. | 280/641 |
| 3,804,432 | 4/1974 | Lehrman | 280/47.33 X |
| 4,009,891 | 3/1977 | Jensen | 280/651 |
| 4,789,180 | 12/1988 | Bell | 280/652 |
| 4,792,152 | 12/1988 | Carolan | 280/DIG. 6 X |
| 5,024,458 | 6/1991 | Kazmark et al. | 280/645 |
| 5,193,842 | 3/1993 | Fontenot | 280/645 |

*Primary Examiner*—Karin L. Tyson
*Assistant Examiner*—Peter English
*Attorney, Agent, or Firm*—James G. O'Neill

[57] ABSTRACT

The mobile carrier for an augmentative communication device of the present invention encompasses an apparatus enabling the carried augmentative communication device and carrier to be pushed or pulled to accommodate users preference for walking and their disability. The handle of the carrier is adjustable, to accommodate different people of different heights, as well as to adapt to individual needs of users depending upon the severity of their handicap, and the carrier is foldable to a cane configuration for instances where there is insufficient space to allow the carrier to be used in its rolling configuration.

17 Claims, 4 Drawing Sheets

MOBILE CARRIER FOR AUGMENTATIVE COMMUNICATION

FIELD OF THE INVENTION

The present invention relates to the field of transport devices and carriers. More specifically, the present invention relates to a carrier for easily transporting devices needed by physically challenged persons and particularly augmentative communication devices by individuals whose movement and speech functions may be impaired.

BACKGROUND OF THE INVENTION

Communication is believed to be the essence of human life. In our society the ability to achieve is often dependent on the ability to communicate. For those of us not born with the ability to communicate, or whose ability to communicate has been impaired, life is often hard and uncontrollable. However, with new technology and the imagination of people who wanted to help, the Augmentative Communication device was conceived and brought to the market.

Market availability of these devices granted people who lack the ability to communicate an opportunity to do so. It allows a special group of individuals who were thought never to have the capability of achieving, to grow and create bright futures for themselves and continually moving towards the goal of independence.

There are a variety of Augmentative Communication Devices available to the public. The devices vary in size, shape, weight and complexity but all have some form of computerized voice and a selection of letters, words or complete thoughts the user may choose from. Some of these devices portray by pictures the thoughts to be transmitted. All which the user may change and enhance as their intelligence progresses.

There are currently several Augmentative Communication Devices commercially available. One company, known as Prentke Romich, has a line of products including the LIBERATOR sm, the TOUCH TALKER sm, and the INTRO TALKER sm. Another company, Sentient Systems Technology Inc. has a model known as the DYNAVOX sm. A company known as Zygo produces models known as MACAW sm, SECRETARY sm, and PARROT sm. The A.C.S. Technologies company produces a product known as the REAL VOICE sm. There may be other devices produced and they are intended to perform a similar function to the devices outlined above, and include any other device which is meant to be transported by the person using it.

Augmentative Communication devices have created greater freedom for non-oral people. For non-ambulatory people, the unit is held by a specially designed mounting bracket for wheelchairs. This allows the wheelchair occupant to use their communication unit whenever and wherever they want. Nothing, however has been proposed for semi-ambulant people, who due to their disabilities are only capable of moving themselves about and usually have very limited control in carrying anything of significant size or weight. Augmentative Communication Devices are evolving constantly with greater capabilities and lighter weight. However, those currently on the market have a weight, with their battery power supply, ranging from about seven pounds to about seventy pounds. This weight, with respect to individuals who are semi-ambulatory, is tremendous. The weight, even if attempted will eventually prove too difficult and dangerous. For if the person were to fall while carrying the device and injure themselves and the unit this could be a major set back in their progress towards independence, and a productive life.

The inability to carry the Augmentative Communication devices creates a high level of frustration in the user. They are in possession of an apparatus which enables them to communicate with the world for the first time, but they are limited as to where and when they can use it. This severe limitation slows down their learning processes as well as creates immense limitations for Augmentative Communication devices which were designed to allow the user to interact freely with their environment.

Having others carry the Augmentative Communication Device is unsatisfactory both due to the excess time of another person which is occupied for a purely mechanical task, as well as the human dependency which is engendered undesirably, rather than diminished. Further, when the Augmentative Communication Device is carried, there is always the possibility that it will be inadvertently dropped. This risk of being dropped is increased when the Augmentative Communication Device is carried by a semi-ambulatory person. Further, the Augmentative Communication Devices are quite expensive, ranging in price from several thousand dollars up to about fifteen thousand dollars. A damaged unit can result in an expensive repair bill and significant down time.

What is therefore needed is a device to help semi-ambulatory, non-oral people over come the challenges accompanying the Augmentative Communication Device both in terms of its weight and mobility. Such a device would free them to face and tackle other challenges, which in turn would permit and encourage them to strive for a fuller life.

SUMMARY OF THE INVENTION

The mobile carrier for an augmentative communication device of the present invention encompasses an apparatus enabling the carried augmentative communication device and carrier to be pushed or pulled to accommodate users preference for walking and disability, since some semi-ambulatory users are best able to pull objects while others are best able to push objects.

The carrier is designed with a high degree of strength and durability. It is preferably made of stainless steel, which will provide the user with a long lasting, weather proof, non-corroding structure. The carrier of the present invention is light weight, enhancing the mobility of the unit. The carrier has a wide wheel base to enable better stability, better control and enhanced safety.

The carrier of the present invention has large rubber wheels which protect the surroundings and enhance maneuverability. The wheel assemblies are securely locked onto the structure to ensure safety. The size of the wheels enhances maneuverability over curbs, steps, obstacles, and all types of terrain such as sand, gravel, etc.

The carrier of the present invention is collapsible, easy to transport, and can be used on busses or in close quarters in the collapsed position, when it generally assumes the shape of a walking cane. The carrier is easy to store. The carrier has an adjustable basket to accommodate users of all heights and to provide better stability during transport. It is easy to adjust and accommodates users in multiple situations, including standing, sitting and walking.

The carrier, in non-mobile situations frees desk and table top space which would otherwise be occupied by an Augmentative Communication Device. The basket may be fitted with rubber tips to protect the Augmentative Communication Device, as well as the surrounding structures near which the carrier is taken. A strap is provided which is intended to engage the Augmentative Communication Device, and it may be fitted with fastening structures, including Velcro hook and loop fasteners, buckles, and snap fasteners.

The handle of the carrier is adjustable, to accommodate different people of different heights, as well as to adapt to individual needs of users depending upon the severity of their handicap. For example, where the handicap involves a dragging foot, the handle of the carrier is extendible to provide sufficient clearance behind the user such that the carrier will not become entangled with the foot of the user. Further, the handle helps to protect the Augmentative Communication Device in the event of a fall, since it limits the extent with which the carrier of the present invention may be tipped backwards. The handle adjusts up and down, as well as to extend outwardly and inwardly, using easy adjusting buttons. The carrier facilitates easy removal of the Augmentative Communication Device, as well as removal of the handle for better accessibility as the desk.

The handle is fitted with a foam hand grip for better grip, greater comfort for use over an extended period of time, and improved shock absorber characteristics when it is inadvertently brushed against a wall. The carrier is also fitted with a stabilizing bar, of about seven inches, for added stability. This stabilizing bar helps to keep the unit from tipping forward or sideways, whether the carrier is in its rolling configuration or in its cane configuration.

DETAILED DESCRIPTION OF THE PREFERRED EMBODIMENT

Figure 1:
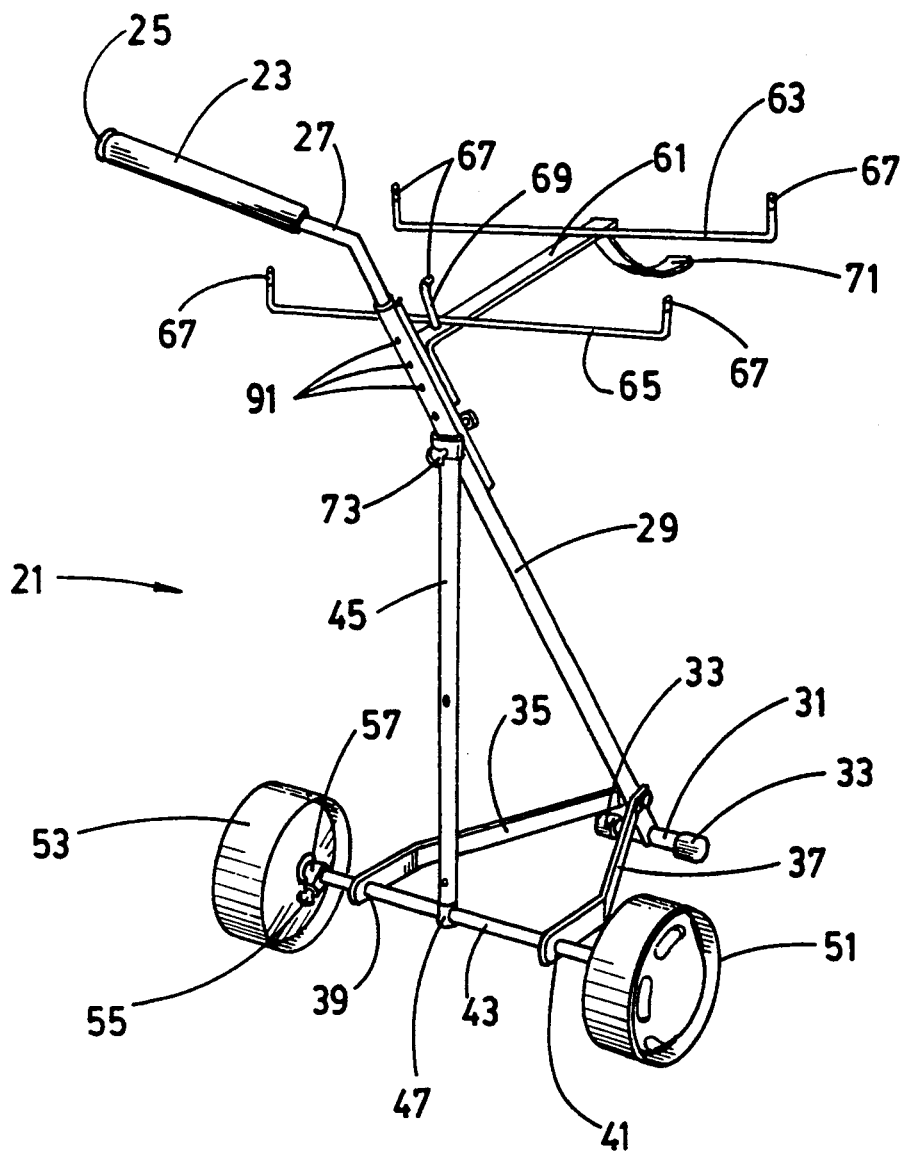
FIG. 1 is a rear perspective view of the carrier of the present invention in its rest position.

The description and operation of the invention will be best described with reference to FIG. 1. FIG. 1 shows a carrier 21 in its rest position, from a rear perspective view. Beginning at the upper portion of the carrier 21, is a foam hand grip 23 overlying an adjustable handle 25. The foam hand grip may be a six inch hand grip commercially obtainable from Eezer Products under catalog number #100100. The Adjustable handle 25 is preferably a ¾ inch outer diameter tube made from No. 304 Stainless Steel Tube, and approximately six inches long also. All of the metal parts of the carrier 21 are presumed to be No. 304 Stainless Steel Tube unless otherwise specified.

Adjustable handle 25 is axially adjustable with respect to an angled handle 27 which is preferably ⅝ inch outer diameter 16 gauge metal tubing having an unbent length of about fourteen and one half inches. The angled handle 27 is received into a main body tube 29 which is a ¾ inch outer diameter 16 gauge metal tubing, approximately thirty two inches long. At the lower end of the main body tube 29 is a stabilizing tube 31, which is preferably ⅞ inches outer diameter metal tubing, and is typically welded to the lower end of the main body tube 29. At the ends of the stabilizing tube 31 are a pair of non slip rubber caps 33.

Attached to the lower portion of the main body tube 29 just above the point of attachment of the stabilizing tube 31, is a first and a second stabilizing strut 35 and 37. The struts 35 and 37 are typically 3/16 of an inch thick and ¾ of an inch wide flat metal, having a length of about thirteen and a half inches. The rear portion of the struts 35 and 37 are fitted with apertures 39 and 41, respectively, which accommodate an axle 43 having an outer diameter of about one half inch, and a length of about fourteen inches.

A back support 45 is a ¾ inch outer diameter 16 gauge tubing supported by the axle 43. Support is provided through an axle adaptor 47, which may be a ⅝ inch outer diameter 16 gauge metal tube, about three inches long. A plastic or polycarbonate piece may be utilized, particularly to facilitate the frictional turning of the axle 43. At one end of the axle 43 is a wheel 51 and at the other end is a matching wheel 53. The wheels 51 and 53 are preferably nine inch plastic wheels with rubber treads. Each of the wheels 51 and 53 are fitted with a wheel thumb screw 55, only one of which is visible in FIG. 1, which is used to securely hold a bearing structure 57, which rotatably supports the wheel 53, onto the end of the axle 43.

Structures of the basket assembly are attached at the upper end of the main body tube 29. A main basket strut 61 is attached to the main body tube 29. Basket strut 61 is a metal bar having a thickness of about 3/16 of an inch and a width of about ¾ of an inch, and which is bent. The basket strut 61 supports a forward basket rod 63 and a rearward basket rod 65. The basket rods 63 and 65 are preferably made from ¼ inch metal rod, and may be selected to custom fit a particular Augmentative Communication Device. The rods 63 and 65 have ends which are bent upwardly, and may be fitted with protective caps 67 which are preferably about ¼ inch in diameter and about ¾ inch long vinyl tubing. At the rear side of the basket strut 61 is a small center rod 69 which extends upwardly and has a tip end which is bent slightly forward, and fitted with a protective cap 67.

The forward end of the basket strut 61 is fitted with a strap 71 to assist in securing an Augmentative Communication Device. Although not many of the fittings are visible in FIG. 1, a rearwardly projecting thumb screw 73 is shown as securing the upper portion of back support 45 into the main body tube 29. The thumb screw is preferably a ¼ inch diameter, having 20 turn per inch threads and about one inch long.

Figure 2:
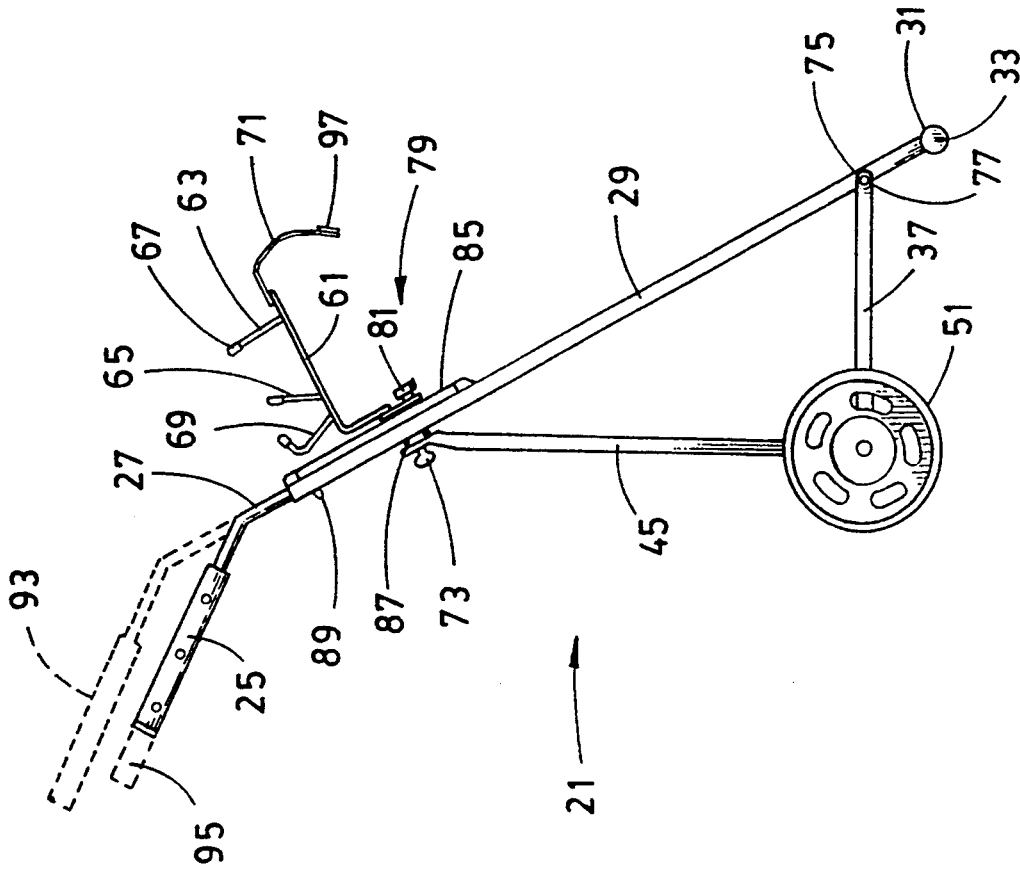
FIG. 2 is a side view of the carrier of the present invention in its rest position and showing the adjustable positions of the handle.

Referring to FIG. 2, a side view illustrates additional structure and features of the carrier 21. A strut nut 75 can be seen engaged by a strut bolt 77. The strut bolt 77 is preferably a ¼ inch diameter, 20 threads per inch, and about one and one half inch long and mates with strut nut 75. A basket slide 79 is visible which includes a pull knob 81 engaging a basket slide plate 83 which is not visible in FIG. 2, but which is visible in FIGS. 3 and 4. Basket slide plate 83 is attached to the main basket strut 61. Basket slide plate 83 slides within a basket track 85. Basket track 85 is preferably a ⅜ inch wide metal track which is about nine inches long and fitted with a series of apertures to permit entry of a pin (not shown) supported by the pull knob 81.

A retaining washer 87 may be present between the upper portion of back support 45 and the main body tube 29. The retaining washer 87 may also be used to axially retain the thumb screw 73. Also visible in FIG. 2 is a position adjusting snap button 89. Snap button 89 is springingly supported by the angled handle 27 to fit within a series of handle adjustment holes 91 which are shown on FIG. 1, which should preferably be about 17/64 of an inch in diameter. In FIG. 1, the holes 91 are most prominently shown, whereas in FIG. 2, the outline of the snap button 89 is most prominently shown.

FIG. 2 also illustrates at least one other differing vertically angled extension position, in a phantom labeled 93, of angled handle 27, which is achievable by changing the snap button 89 from one of the holes 91 in the main body tube 29 to a hole 91 located at a higher position. In a second phantom labeled 95, at least one other differing extension of adjustable handle 25 is shown.

Also shown at the end of the strap 71 is a fastener 97. Fastener 97 may be of many types, including buckle, Velcro hook and loop fasteners, quick release, or hook, to name but a few.

Figure 3:
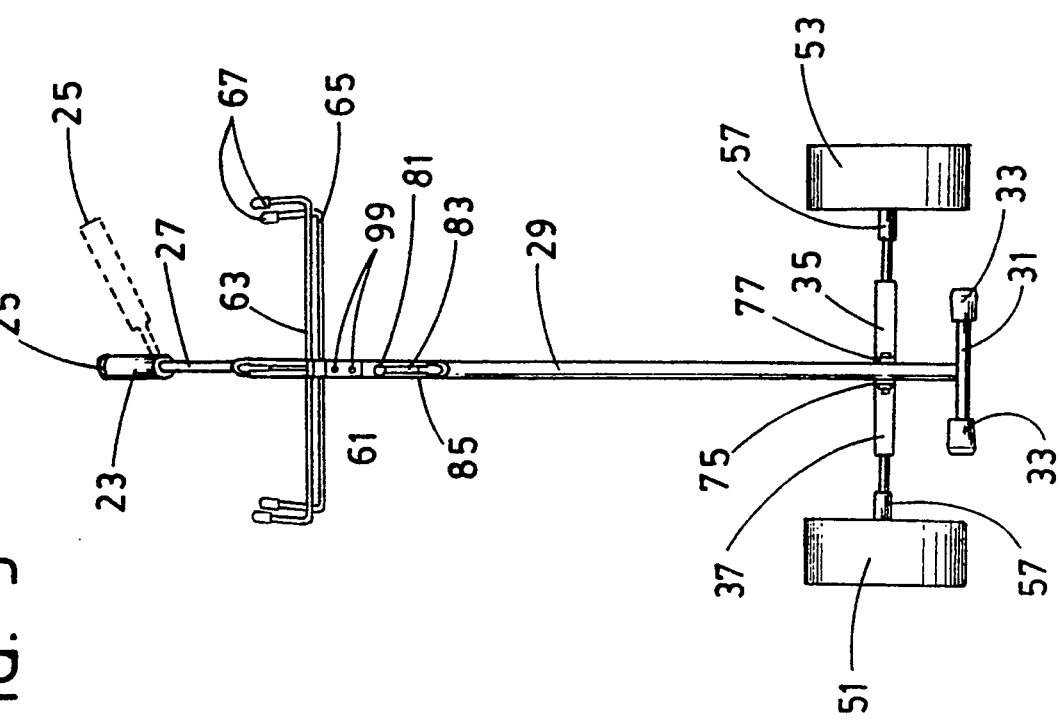
FIG. 3 is a front view of the carrier of the present invention in its rest position and showing the side position of the adjustable handle.

Referring to FIG. 3, a front view of the carrier 21 more clearly illustrates the basket slide plate 83, basket track 85, and pull knob 81. The bolts 99, which fix the main basket strut 61 to the basket slide plate 83 are visible for the first time in FIG. 3. Also shown is an angular position of the adjustable handle 25. In this manner, the handle 25 can be set to angle off to the side to facilitate one handed pulling of the carrier 21.

Figure 4:
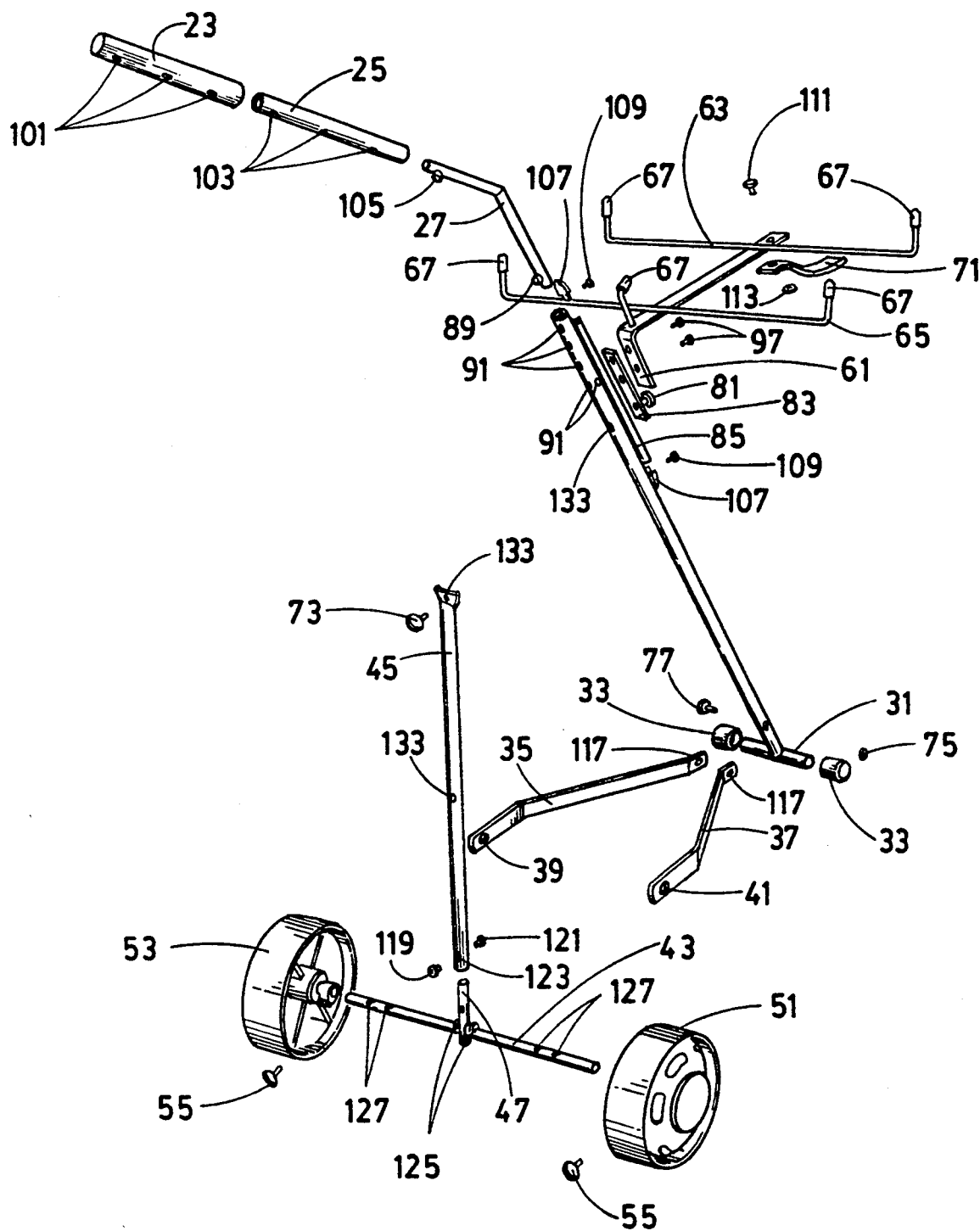
FIG. 4 is an exploded perspective view of the carrier of the present invention.

In FIG. 4, which is an exploded view, the greatest detail is illustrated. Foam hand grip 23 can be seen to have a series of adjustment holes 101, which may preferably be about 17/64 of an inch in diameter. Adjustable handle 25 has a matching set of holes 103. The aligned holes 101 and 103 cooperate with a snap button 105, which should have an outer diameter of slightly less than 17/64 of an inch, which was not previously observable in the side view of FIG. 2 due to the thickness of the foam hand grip 23. Also is seen the position of the snap button 89 with respect to the angled handle 27.

At the ends of the basket slide plate 83 are located a pair of track end stops 107 which smooth the transition from the surface of main body tube 29 to the surface of the basket slide plate, and form an effective stop for the basket slide plate 83. The provision of a transition minimizes the sharp edges located near the handle 25. The track end stops 107 are retained with track end stop retaining rivets 109 having a diameter of about 3/16 of an inch and a length of about ¼ of an inch.

The strap 71 is shown being held in place with a tie down bolt 111 having a diameter of about 10/24 of an inch and a length of about one half inch, and which is used in conjunction with a tie down nut 113 which may be used with a star washer (not shown).

In the exploded view of FIG. 4, a threaded aperture of a thumb screw nut 115 accommodates the thumb screw 73. Other apertures are present, including the main body holes 117, in the ends of the first and second stabilizing struts 35 and 37, which are preferably about 9/32 of an inch. The halves 119 and 121 of a back support fastening pop rivet, preferably a 3/16 of an inch aluminum structure making a fastening structure about ¼ of an inch long, are shown with respect to a pop rivet aperture 123 on the back support 45.

FIG. 4 also reveals the presence of retaining dimples 125 for the back support adapter 47 which act to prevent the back support adapter 47 from moving to the right or to the left on the axle 43 as it turns. Similarly, FIG. 4 also reveals the presence of retaining dimples 127 for the first and second stabilizing struts 35 and 37 which act to prevent the first and second stabilizing struts 35 and 37 from moving inwardly or outwardly on axle 43 as it turns.

Figure 5:
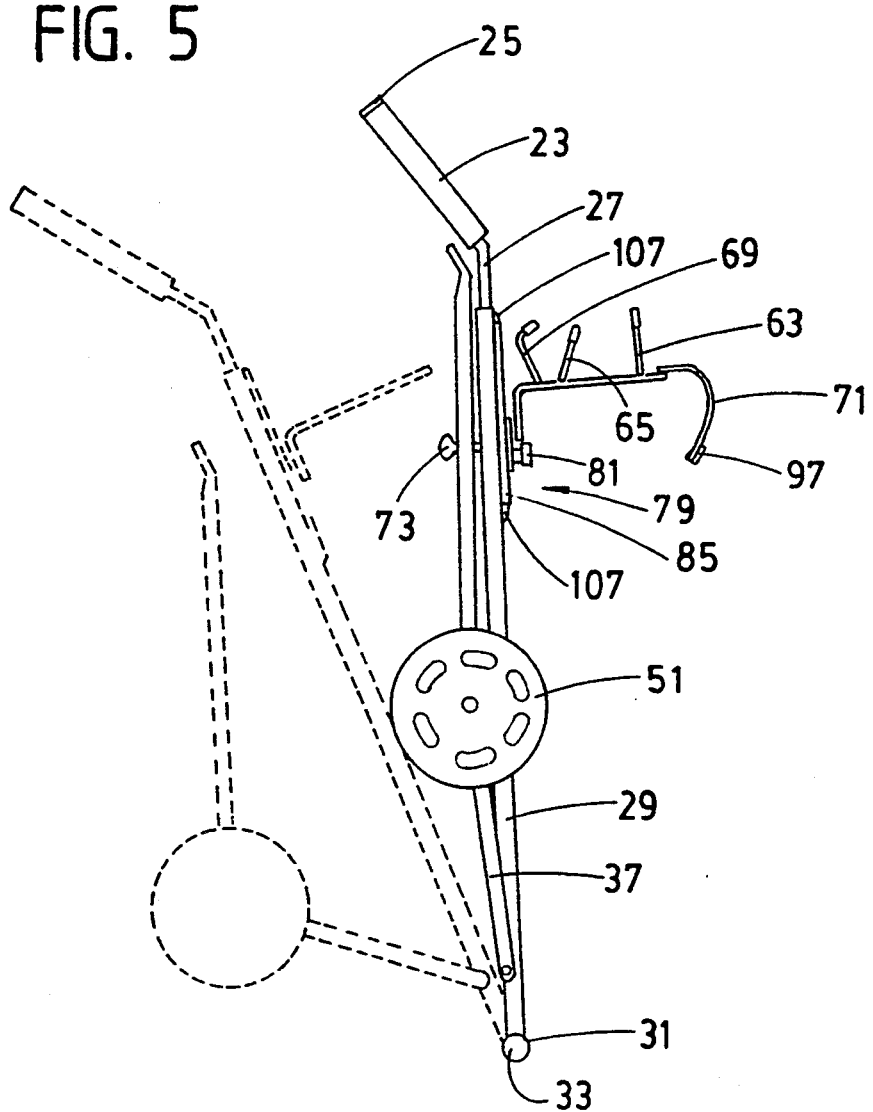
FIG. 5 is a side view of the carrier of the present invention illustrating its folded position, and an intermediate position between its folded and unfolded position, shown in phantom.

Also, and more importantly in explaining FIG. 5, FIG. 4 illustrates the presence of an aperture 133 along the length of the back support 45, into which the thumb screw 73 was shown in position in FIGS. 1–3. A collapsed position aperture 133 near the middle of the back support 45 will be used to place the carrier 21 in a collapsed position, as will be shown in FIG. 5.

If the thumb screw is removed from engagement with a threaded aperture of a thumb screw nut 115 through aperture 133, the carrier begins to collapse as is shown in FIG. 5. If the thumb screw is re-inserted into the thumb screw nut 115 through aperture 133, as is shown in FIG. 5, the carrier 21 will assume a collapsed position to facilitate the carriage of an augmentative communication device in a cane configuration. This cane configuration is handy for cramped situations, such as travel in a bus.

Figure 6:
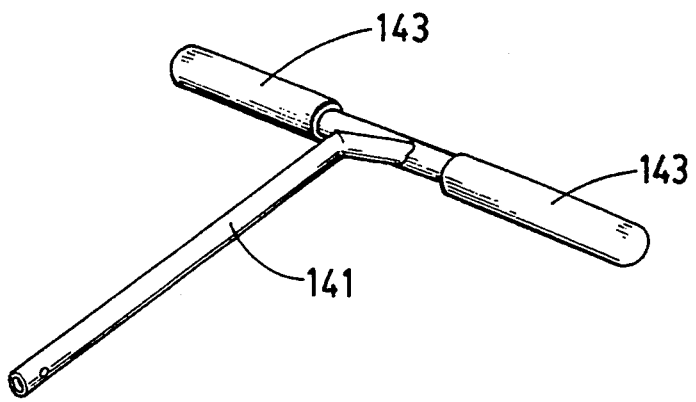
FIG. 6 is a perspective view of an alternative embodiment of the handle shown in FIGS. 1-4.

Referring to FIG. 6, an alternative pattern for an adjustable handle is shown, namely a t-shaped handle 141. T-shaped handle 141 is shown with foam hand grips 143 to facilitate easy manipulation. T-shaped handle engages main body tube 29 in the same manner as the adjustable handle 25.

While the present invention has been described in terms of an augmentative communications device carrier, one skilled in the art will realize that the structure and techniques of the present invention can be applied to carry many appliances. The present invention may be applied in any situation where a device requires carriage, especially by an individual of limited locomotive capability.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed is:

1. A carrier comprising:
   wheel means for providing rolling support;
   a back support having a first end pivotally engaging said wheel means, and a second end;
   a main support having a first end and a second end and engaging said back support near said first end of said main support;
   a first aperture in said back support near the second end of said back support and a second aperture in said back support near a central portion of said back support;

selectable attachment means for enabling said back support to be selectably, manually attached to or detached from engagement with said first end of said main support at the second end of said back support or near the central portion of said back support, said selectable attachment means including a nut carried on said main support and a manually operable bolt for engaging said nut; through one of said first and second apertures;

at least one strut having a first end pivotally engaging said main support near said second end of said main support and a second end engaging said wheel means;

handle means, engaging said main support near said first end of said main support to facilitate movement of said carrier; and object carriage means, supported by said main support, for securing objects to be carried.

2. A carrier comprising:

an axle having a first end and a second end;

a first wheel assembly supported by said first end of said axle;

a second wheel assembly supported by said second end of said axle;

a back support having a first end pivotally engaging said axle, and a second end;

a main support having a first end and a second end and engaging said back support near said first end of said main support;

selectable attachment means, supported by said main support, for enabling said back support to be selectably, manually attached to or detached from engagement with said first end of said main support at the second end of said back support, or near a central portion of said back support;

at least one strut having a first end pivotally engaging said main support near said second end of said main support and a second end engaging said axle;

handle means, engaging said main support near said first end of said main support, to facilitate movement of said carrier; and object carriage means, supported by said main support, for securing objects to be carried.

3. A carrier for an augmentative communication device comprising, in combination:

a substantially tubular main support having a first end and a second end;

an axle having a first end and a second end;

a first wheel assembly supported by said first end of said axle;

a second wheel assembly supported by said second end of said axle;

a substantially tubular back support having a first end pivotally engaging said axle, and a second end engaging said substantially tubular main support near said first end of said substantially tubular main support;

at least one strut having a first end pivotally engaging said substantially tubular main support near said second end of said substantially tubular main support, and a second end rotatably engaging said axle;

handle means adjustably carried in said substantially tubular main support near said first end of said substantially tubular main support, to facilitate movement of said carrier; and object carriage means, adjustably supported by said substantially tubular main support near said first end of said substantially tubular main support, for securing objects to be carried.

4. The carrier recited in claim 3 wherein said wheel assemblies each further comprise a bearing assembly supported by said axle and a wheel supported by said bearing assembly.

5. The carrier recited in claim 4 wherein each of said wheels rotate along the same axis.

6. The carrier of claim 4 wherein said second end of said substantially tubular back support is manually detachable from engagement with said first end of said substantially tubular main support.

7. The carrier of claim 6, further comprising selectable attachment means, supported by said substantially tubular main support, for enabling said substantially tubular back support to be selectably attached to said first end of said substantially tubular main support at the second end of said substantially tubular back support, or near a central portion of said substantially tubular back support.

8. The carrier of claim 7 wherein said substantially tubular back support carries a first aperture near said second end of said substantially tubular back support and a second aperture near said central portion of said substantially tubular back support and wherein said selectable attachment means further comprises:

a nut carried on said substantially tubular main support; and a manually operable bolt for engaging said nut through one of said first and second apertures.

9. The carrier of claim 3 further comprising a stabilizing tube connected to the second end of said substantially tubular main support.

10. The carrier of claim 3 wherein said object carriage means further comprises:

a main basket strut extending away from said substantially tubular main support; and at least one basket rod, supported by said main basket strut to provide support for an object to be carried.

11. The carrier of claim 3 further comprising: at least one flexible strap, supported by said object carriage means; and at least one fastener, attached to said at least one strap.

12. The carrier of claim 3, further comprising adjustment means, positioned between said object carriage means and said substantially tubular main support, for adjusting the position of said object carriage means with respect to said substantially tubular main support.

13. The carrier of claim 12 wherein said adjustment means further comprises:

a slide attached to said substantially tubular main support;

a slide plate slidably supported by said slide; and locking means, supported by said slide plate, for securing the position of said slide plate with respect to said slide.

14. The carrier of claim 3 wherein said handle means further comprises;

an angled member, having a first end co-axially fittable with respect to said first end of said substantially tubular main support, and a second end, at least one of said angled member and said substantially tubular main support having at least one snap button aperture; and a first snap button supported by the other said angled member and said substantially tubular main support, said first snap button fittable within said at least one snap button aperture for axially securing said angled member with respect to said substantially tubular main support.

15. The carrier of claim 14 wherein said angled member is pivotally supported with respect to said substantially tubular main support.

16. The carrier of claim 14 wherein said handle means further comprises:
   a straight member, co-axially fittable with respect to said second end of said angled member, at least one of said angled member and said straight member having at least one snap button aperture; and
   a second snap button supported by the other of said angled member and said straight member, said snap button fittable within said snap button aperture for axially securing said straight member with respect to said angled member.

17. The carrier of claim 3 wherein said handle means further comprises;

an angled member, having a first end co-axially fittable with respect to said first end of said substantially tubular main support, and a second end, at least one of said angled member and said substantially tubular main support having at least one snap button aperture; and
   a first snap button supported by the other said angled member and said substantially tubular main support, said first snap button fittable within said at least one snap button aperture for axially securing said angled member with respect to said substantially tubular main support;
   a straight member, co-axially fittable with respect to said second end of said angled member and said straight member having at least one snap button aperture; and
   a second snap button supported by the other said angled member and said straight member, said second snap button fittable within said at least one snap button aperture for axially securing said straight member with respect to said angled member.

* * * * *